United States Patent
Arikawa et al.

(10) Patent No.: US 6,674,613 B2
(45) Date of Patent: Jan. 6, 2004

(54) DISK DEVICE HAVING POWDER REMOVAL APPARATUS AND DISK DEVICE HAVING TIMING OFFSETTING APPARATUS FOR LOADING

(75) Inventors: Yoshihiro Arikawa, Kawasaki (JP); Kaoru Abiko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 75 days.

(21) Appl. No.: 09/916,467

(22) Filed: Jul. 27, 2001

(65) Prior Publication Data

US 2002/0093768 A1 Jul. 18, 2002

(30) Foreign Application Priority Data

Jan. 15, 2001 (JP) ........................................ 2001-006661

(51) Int. Cl.[7] ............................. G11B 5/54; G11B 21/22
(52) U.S. Cl. ................................. 360/254.7; 360/254.8
(58) Field of Search .......................... 360/254.7, 254.8, 360/255.6, 255.7, 255.8, 254.9

(56) References Cited

U.S. PATENT DOCUMENTS

| | | | | |
|---|---|---|---|---|
| 5,341,260 A | * | 8/1994 | Jabbari | 360/254.8 |
| 5,864,448 A | * | 1/1999 | Berberich | 360/254.8 |
| 6,078,474 A | * | 6/2000 | Koyanagi et al. | 360/254.8 |
| 6,226,154 B1 | * | 5/2001 | Albrecht | 360/254.8 |
| 6,226,155 B1 | * | 5/2001 | Watanabe et al. | 360/254.8 |
| 6,246,534 B1 | * | 6/2001 | Gillis et al. | 360/75 |
| 6,278,584 B1 | * | 8/2001 | Zhang et al. | 360/254.8 |
| 6,307,716 B1 | * | 10/2001 | Hamaguchi et al. | 360/254.4 |

FOREIGN PATENT DOCUMENTS

| | | | | |
|---|---|---|---|---|
| JP | 2-50312 | 2/1990 | | |
| JP | 05067379 A | * | 3/1993 | G11B/21/12 |
| JP | 5-314434 | 11/1993 | | |
| JP | 10-233012 | 9/1998 | | |
| JP | 10-326416 | 12/1998 | | |
| JP | 2000-76632 | 3/2000 | | |
| JP | 2000076811 A | * | 3/2000 | G11B/21/21 |
| JP | 2000132937 A | * | 5/2000 | G11B/21/22 |
| JP | 2000-173030 | 6/2000 | | |
| JP | 2001291349 A | * | 10/2001 | G11B/21/12 |

* cited by examiner

*Primary Examiner*—William Klimowicz
(74) *Attorney, Agent, or Firm*—Greer, Burns & Crain, Ltd.

(57) ABSTRACT

A disk device includes a chassis base, at least one disk rotatably supported on the chassis base, at least one carriage arm pivotable about an axis on one end and, at the other end, having a slider with a read/write head and a load bar extending from the slider, a ramp member attached to the chassis base at a position outside the disk, the ramp member having a guiding part and a parking part, and an actuator for driving the carriage arm between a loaded position in which the slider is held above the disk and an unloaded position in which the load bar rests on the parking part of the ramp member. The ramp member is provided with cleaning structure for removing powder attached to the load bar as the load bar moves along the parking part. The disk device is further provided with timing offsetting structure for offsetting the timing of the load bar of one of the carriage arms ascending the guiding part from the timing of the load bar of one of the other carriage arms ascending the guiding part when the carriage arms are driven to move from the unloaded position to the loaded position.

12 Claims, 13 Drawing Sheets

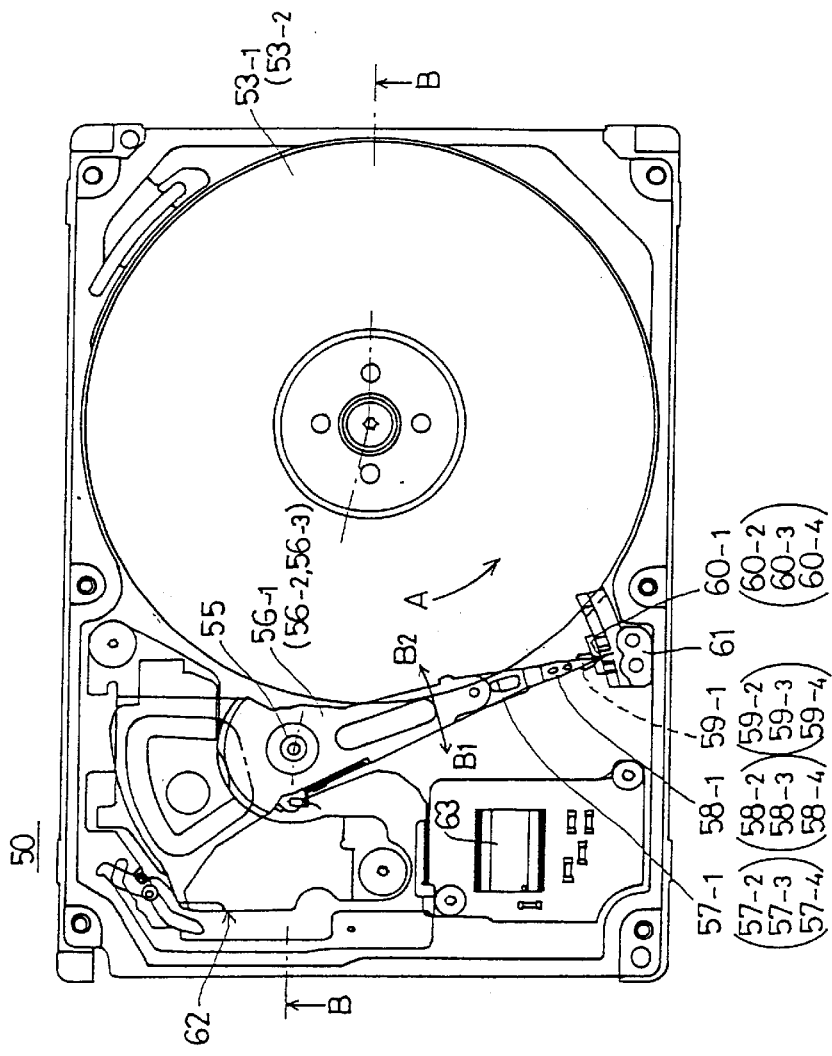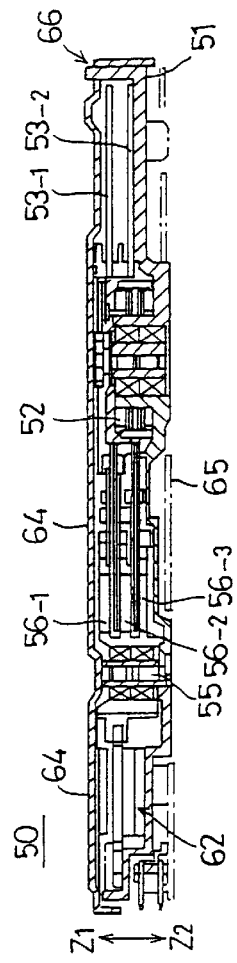
FIG. 3A
FIG. 3B

DISK DEVICE HAVING POWDER REMOVAL APPARATUS AND DISK DEVICE HAVING TIMING OFFSETTING APPARATUS FOR LOADING

BACKGROUND OF THE INVENTION

1. Field of the Invention

The present invention relates to a disk device and particularly relates to a load/unload-type hard disk device including a carriage arm with a load bar at its tip and a ramp member provided on a chassis base for supporting the load bar.

2. Description of the Related Art

Hard disk devices magnetically store information and are typically installed in computer machines. Among various types of computer machines, a portable notebook-type computer machine is often subjected to unintended impact because a user may drop it or hit it against an object. Therefore, a highly shock-resistant structure is required for notebook-type computer machines.

Hard disk devices to be installed in notebook-type computer machines are required to have improved shock-resistance compared to hard disk devices to be installed in desktop-type computer machines.

There are two types of hard disk devices when categorized according to the position of a slider in a stop mode. One is a contact-start-stop type where the slider is held above an inner periphery side of the hard disk and another is a load-unload type where the slider is retracted to a position outside the periphery of the hard disk. The load-unload type hard disk device includes a load bar provided at a tip of a carriage arm and a ramp member provided on a chassis base for supporting the load bar. When the slider is retracted to a position outside the periphery of the hard disk, the ramp member supports the load bar. In other words, the slider is supported by the ramp member via the load bar. Here, the term "unloading" is to be understood as an operation in which the slider positioned above the hard disk is retracted to a position outside the periphery of the hard disk. The term "loading" is to be understood as an operation in which the slider at a position outside the periphery of the hard disk is moved to a position above the hard disk.

Generally, in terms of shock resistance, the load-unload type hard disk device is more reliable compared to the contact-start-stop type hard disk device. Therefore, the notebook-type computer devices are often installed with the load-unload type hard disk devices.

FIGS. 1A and 1B are a plan view and a side view, respectively, showing a hard disk device of the related art in an unloaded state where the slider is retracted to a position outside a hard disk 10. The hard disk 10 is rotated at a high speed in a direction shown by an arrow A. A ramp member 11 is a molded component made of synthetic resin and is screwed on a chassis base (not shown) of the hard disk device at a position outside the hard disk 10. An upper load bar 12, a lower load bar 13, an upper slider 14 and a lower slider 15 are also shown in the figures. Magnetic heads are provided in side surfaces of each of the sliders 14 and 15. A carriage arm 16 is also shown. When the carriage arm 16 is pivotally moved by a voice-coil-motor-type actuator (not shown), the load bars 12, 13 and the sliders 14, 15 are moved in the directions shown by a double-headed arrow B1, B2.

As shown in FIGS. 2 and 1B, the ramp member 11 is provided with a trapezoidal guiding part 20 and a parking part 21 for the upper load bar 12 and a trapezoidal guiding part 22 and a parking part 23 for the lower load bar 13.

The parking parts 21, 23 have smooth surfaces so that the load bars 12, 13 can be moved smoothly.

The guiding parts 20, 22 include hard disk (HD) side ramp surfaces 20a, 22a closer to the hard disk 10, parking part-side ramp surfaces 20b, 22b adjacent the parking parts and intermediate surfaces 20c, 22c between the HD-side and parking part side ramp surfaces, respectively. All surfaces are made smooth for smooth movements of the load bars 12, 13. The parking part-side ramp surfaces 20b, 22b are substantially at the same position in the B1–B2 direction.

When an unload command is supplied during read/write operation, the carriage arm 16 is pivoted in a clockwise direction. The load bars 12, 13 are moved over the guiding parts 20, 22 until they reach the parking parts 21, 23. The hard disk device is now in an unloaded state as shown in FIGS. 1A and 1B. When a load command is supplied during the unloaded state, the carriage arm 16 is pivoted in an anti-clockwise direction. The load bars 12, 13 are moved over the guiding parts 20, 22 for implementing a loading operation. The sliders 14, 15 are loaded above the hard disk 10 and are held against an upper surface 10a and a lower surface 10b of the rotating hard disk 10. Then, the read/write operation of information is initiated.

As shown in FIG. 1B, the load bars 12, 13 move along broken lines 30, 31, respectively, and the sliders 14, 15 move along broken lines 32, 33, respectively.

Each time an unload/load operation is implemented, the load bars 12, 13 slide on the guiding parts 20, 22 and the parking parts 21, 23 of the ramp member 11. When such sliding operations are repeated frequently, the ramp member 11 is abrased and unwanted powder of abrased material is produced. The powder then attaches to the load bars 12, 13 and eventually falls off from the load bars 12, 13.

If the powder falls off from the load bars 12, 13 while the sliders 14, 15 are loaded above the hard disk 10, the powder will fall onto the hard disk 10. If the powder intrudes between the hard disk 10 and the sliders 14, 15 held against the hard disk 10, a head crash occurs and a recording surface of the hard disk 10 may be damaged.

During the loading operation, the load bars 12, 13 ascend the parking part-side ramp surfaces 20b, 22b, respectively. The load bars 12, 13 ascend at the same timings. Accordingly, a considerably great load must be applied to the actuator (not shown) and thus a considerable amount of electric current is required for driving the actuator. Therefore, the power consumption of the hard disk device becomes even higher.

The load applied to the actuator during loading operation becomes higher as the number of hard disks 10 installed in the hard disk device, the number of the sliders and the number of the load bars increase. Accordingly, more electric current is required for driving the actuator and thus the consumption power of the hard disk device increases.

Since such a hard disk device is installed in a notebook-type personal computer and is driven by a battery mounted in the notebook-type personal computer, there is a need for a hard disk device operable with reduced power consumption.

SUMMARY OF THE INVENTION

Accordingly, it is a general object of the present invention to provide a hard disk device which can satisfy the need described above.

It is another and more specific object of the present invention to provide a hard disk device which can prevent the powder on the load bar from being dropped on the surface of hard disks.

In order to achieve the above object, a disk device is provided which includes:

a chassis base;

at least one disk rotatably supported on the chassis base;

at least one carriage arm pivotable about an axis on one end and, at the other end, having a slider with a read/write head and a load bar extending from the slider;

a ramp member attached to the chassis base at a position outside the disk, the ramp member having a guiding part and a parking part; and an actuator for driving the carriage arm between a loaded position in which the slider is held above the disk and an unloaded position in which the load bar rests on the parking part of the ramp member, wherein the ramp member is provided with cleaning means for removing powder attached to the load bar as the load bar moves along the parking part.

With the above invention, an occurrence of head crash due to powder can be effectively avoided.

It is still another object of the invention to provide a hard disk device which can disperse the load applied to the actuator during a loading operation.

In order to achieve the above object, a disk device is provided which includes:

a chassis base;

at least one disk rotatably supported on the chassis base;

at least two carriage arms pivotable about an axis on one end and, at the other end, having a slider with a read/write head and a load bar extending from the slider;

a ramp member attached to the chassis base at a position outside the disk, the ramp member having a guiding part and a parking part;

an actuator for driving the carriage arms between a loaded position in which the slider is held above the disk and an unloaded position in which the load bar rests on the parking part of the ramp member; and timing offsetting means for offsetting the timing of the load bar of one of the carriage arms ascending the guiding part from the timing of the load bar of one of the other carriage arms ascending the guiding part when the carriage arms are driven to move from the unloaded position to the loaded position.

With the above invention, the maximum value of the current required for driving the actuator is reduced.

BRIEF DESCRIPTION OF THE DRAWINGS

FIGS. 3A and 3B are a plan view and a side view, respectively, showing a hard disk device of an embodiment of the present invention.

DETAILED DESCRIPTION OF THE PREFERRED EMBODIMENTS

In the following, principles and embodiments of the present invention will be described with reference to the accompanying drawings.

Figure 1A:
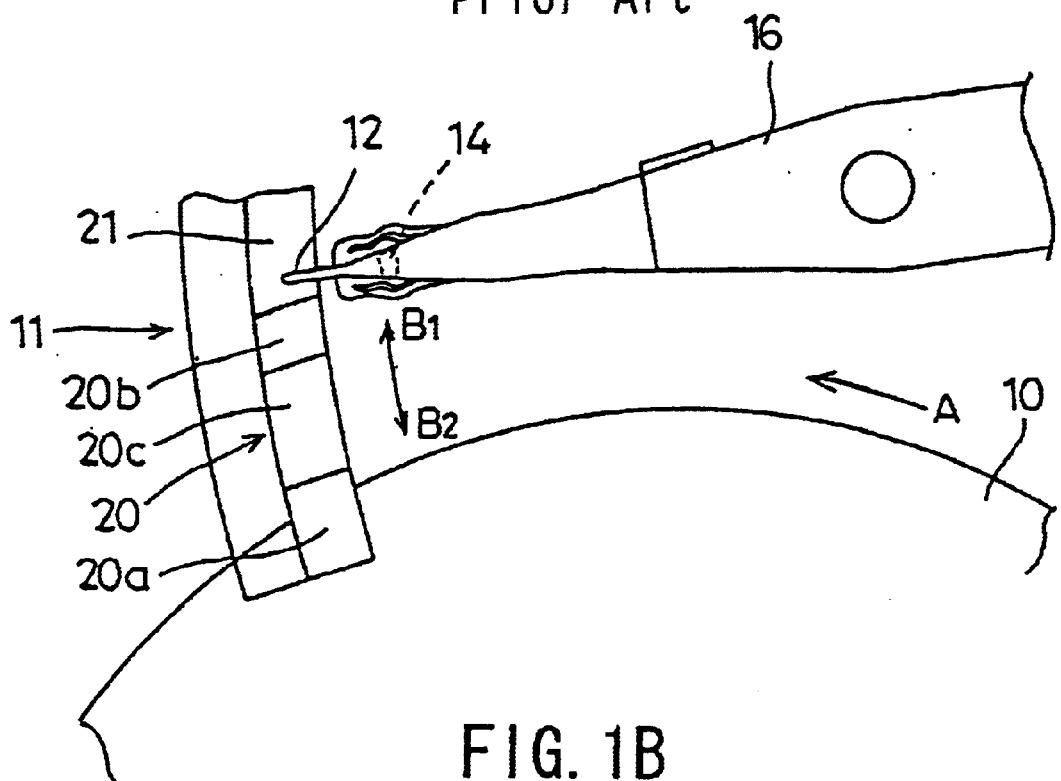
FIGS. 1A and 1B are a plan view and a side view, respectively, showing a hard disk device of the related art.
Figure 1B:
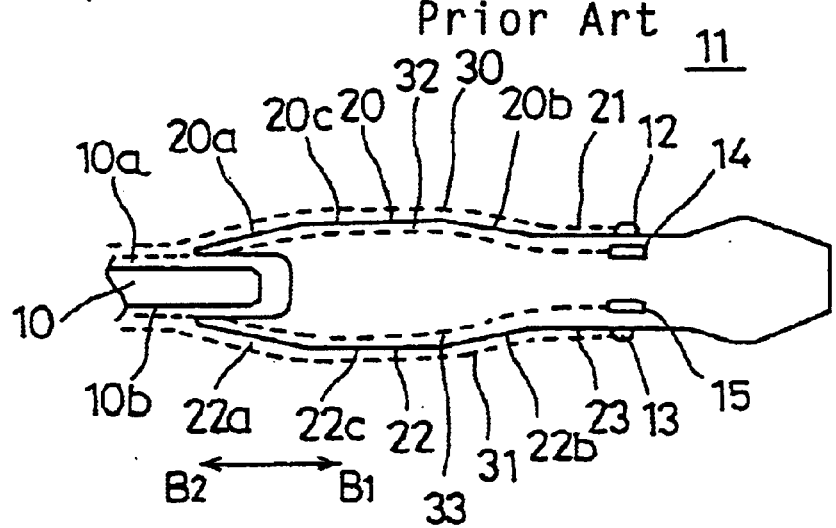
Figure 2:
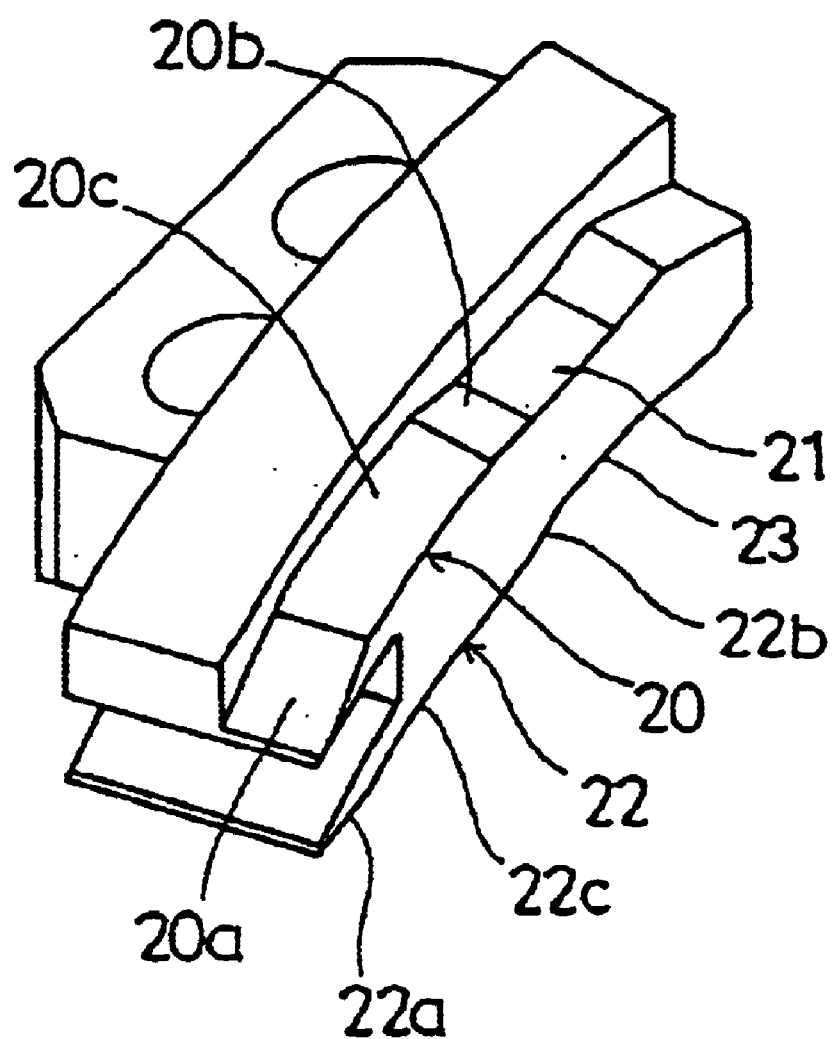
FIG. 2 is an enlarged perspective diagram of the ramp member shown in FIG. 1A.
Figure 4:
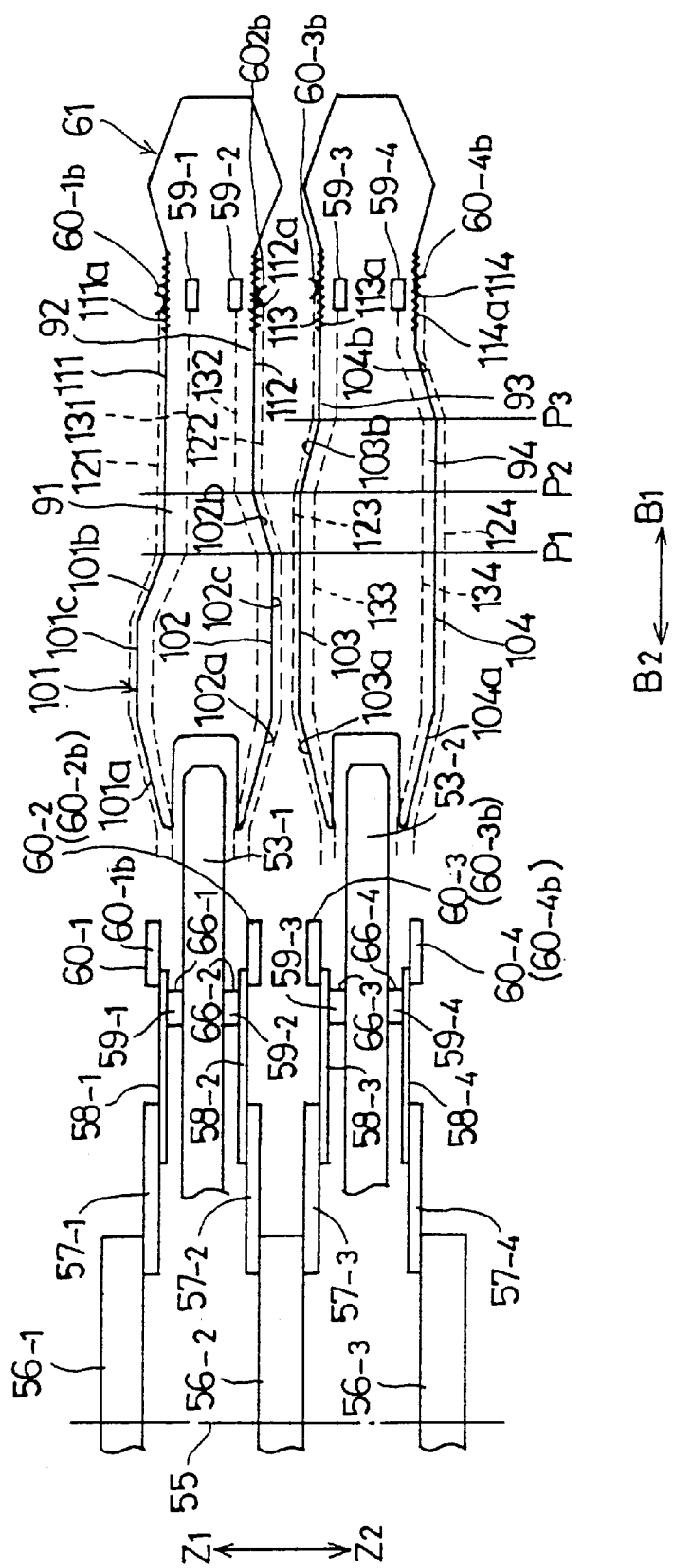
FIG. 4 is a schematic diagram showing structures of parts related to the slider shown in FIGS. 3A and 3B.

FIGS. 3A and 3B are a plan view and a cross-sectional view, respectively, showing a hard disk device 50 of an embodiment of the present invention. FIG. 3A shows the hard disk device 50 with a cover member 64 being removed. FIG. 3B is a cross-sectional view of the hard disk device 50 viewed along a line B—B. FIG. 4 is a schematic diagram of a structure of parts related to a slider. In the figures, a double-headed arrow Z1–Z2 indicates a vertical direction.

The hard disk device 50 generally includes a chassis base 51 having a shallow recessed part and a cover member 64 covering an upper surface of the chassis base 51, which together form a disk enclosure 66 providing a sealed space. A spindle motor 52 is provided on the chassis base 51 and two 2.5 inch hard disks 53-1, 53-2 are attached to a rotor of the spindle motor 52. Carriage arms 56-1, 56-2, 56-3 are pivotably supported by an axis 55 on the chassis base 51. Spacers 57-1 to 57-4, load beams 58-1 to 58-4, sliders 59-1 to 59-4 and load bars 60-1 to 60-4 are provided at the tip end of the carriage arms 56-1, 56-2, 56-3. A ramp member 61 is screwed on the chassis base 51. An actuator 62 of a voice coil motor type is provided on an upper surface of the chassis base 51. The carriage arms 56-1, 56-2, 56-3 are reciprocally pivoted by the actuator 62. A head IC 63 is also provided on the chassis base 51. A printed circuit board assembly 65 is fixed on a lower surface of the chassis base 51. Magnetic heads 66-1 to 66-4 are incorporated in side surfaces of the sliders 59-1 to 59-4. The hard disks 53-1, 53-2 and so on are accommodated in the disk enclosure 66.

The hard disk device 50 is installed in a notebook-type personal computer which may be driven by a battery mounted therein.

The hard disks 53-1, 53-2 are rotated by the spindle motor 52 in a direction shown by an arrow A at a rotational speed of about 4000 rpm. The carriage arms 56-1 to 56-3 are moved by the actuator 62 in directions B1–B2. Thus, the sliders 59-1 to 59-4 are moved in this radial direction while being held above the surfaces of the hard disks 53-1, 53-2, so as to scan target tracks. The information is read or written by the magnetic heads 66-1 to 66-4.

The reproduction signals read out from the hard disks 53-1, 53-2 are supplied to the head IC 63 where the reproduction signals are amplified. The amplified reproduction signals are supplied to the printed circuit board assembly 65. While recording signals are supplied from the head IC 63, the reproduction signals read by the magnetic heads 66-1 to 66-4 are amplified and supplied to the printed circuit board assembly 65.

Figure 5:
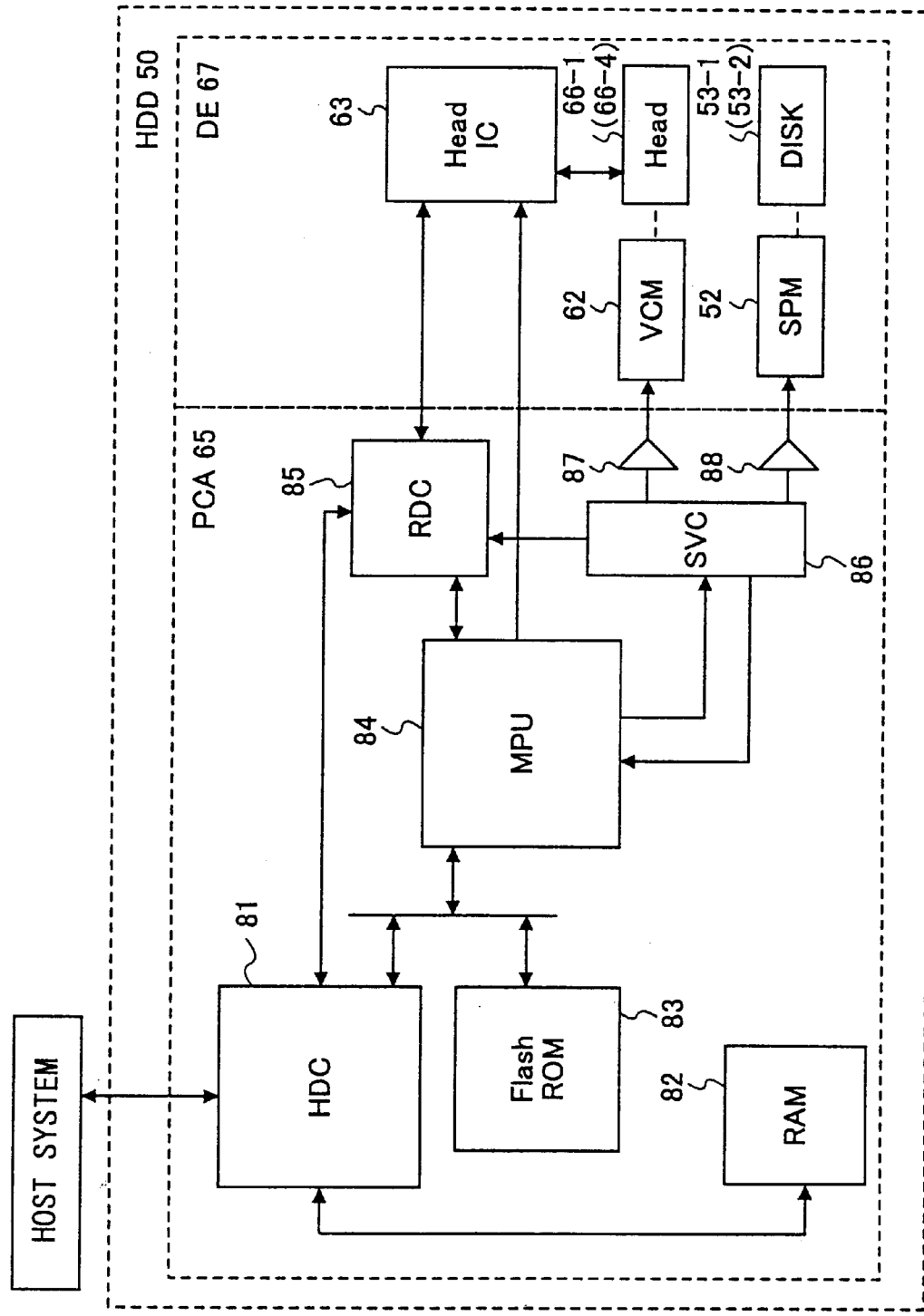
FIG. 5 is a block diagram showing the hard disk device of FIGS. 3A and 3B.

As shown in FIG. 5, the printed circuit board assembly 65 includes a hard disk controller (HDC) 81, a RAM 82, a ROM 83, an MPU 84, a read channel 85, a servo controller (SVC) 86 and drivers 87, 88.

The MPU 84 operates in accordance with a program stored in the ROM 83 and controls the actuator 62 via the servo controller 86, so as to implement a loading operation in which the sliders 59-1 to 59-4 are moved off from the ramp member 61 and loaded onto the hard disks 53-1, 53-2 and an unloading operation in which the sliders 59-1 to 59-4 are moved away from the hard disks 53-1, 53-2 and rested on the ramp member 61.

Figure 6:
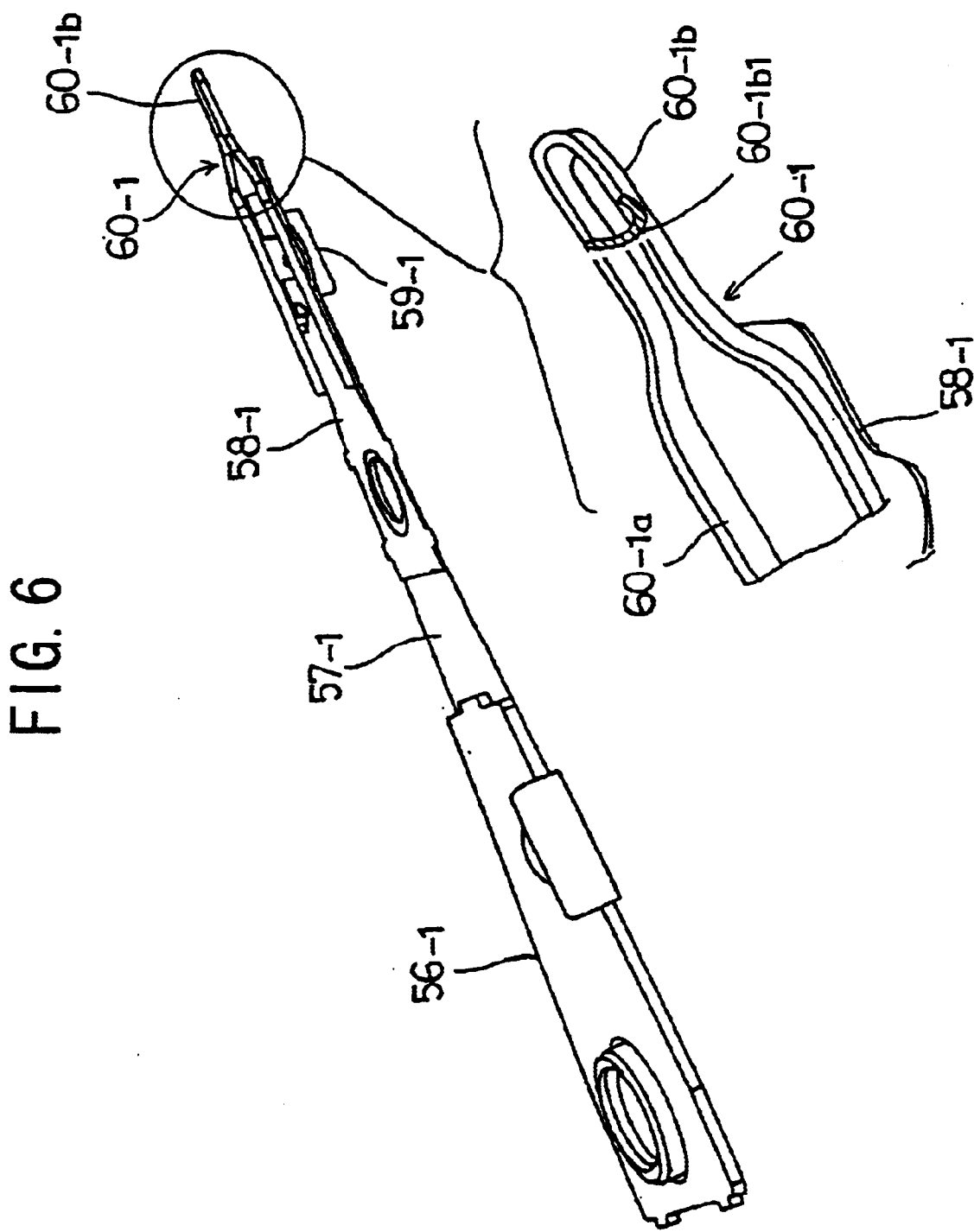
FIG. 6 is an enlarged diagram of a load beam shown in FIGS. 3A and 3B and associated parts thereof.
Figure 7:
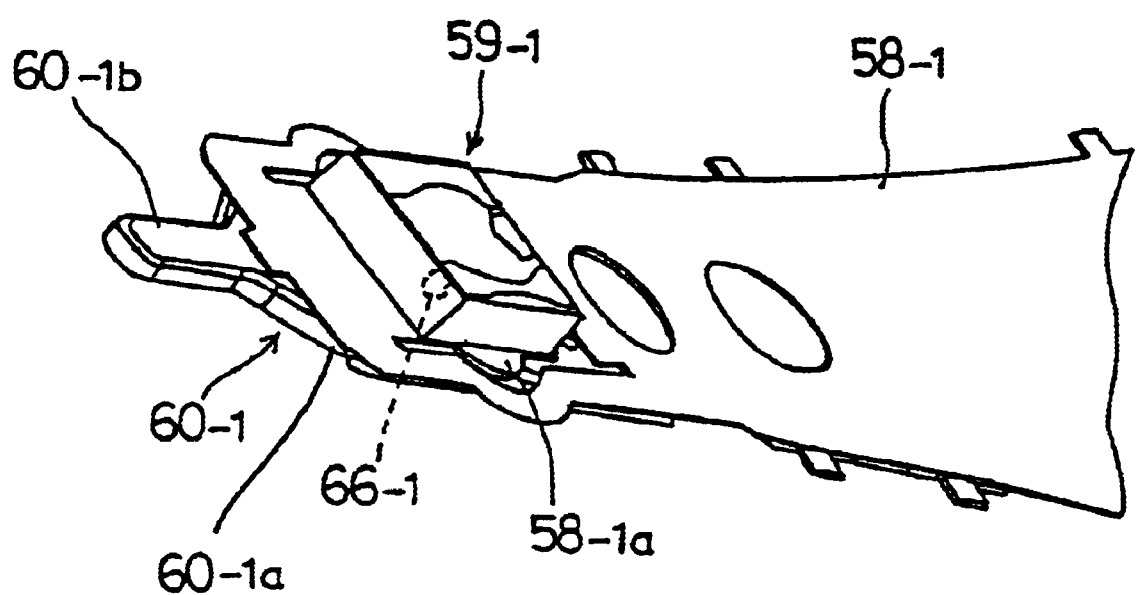
FIG. 7 is an enlarged perspective diagram of a tip end of the load beam shown in FIGS. 3A and 3B viewed from the lower side.

As shown in FIGS. 6 and 7, the load bar 60-1 includes a main part 60-1a and a finger part 60-1b extending from the main part 60-1a. The main part 60-1a is fixed on an upper surface of the tip end of the load beam 58-1 by laser beam welding. The finger part 60-1b protrudes forwardly from the lead beam 58-1. For higher flexural rigidity, the finger part 60-1 is pressed to provide a semi-cylindrical shape. A cylindrical surface 60-1b1 of the finger part 60-1 serves to provide smooth sliding movement of the finger part 60-1b over the ramp member 61.

The slider 59-1 is fixed on a gimbal part 58-1a provided on the tip end of the lead beam 58-1. The base end of lead beam 58-1 is fixed on the tip end of the spacer 57-1. The base end of the spacer 57-1 is fixed on the tip end of the carriage arm 56-1.

The remaining carriage arms 56-2, 56-3, spacers 57-2 to 57-4 and load beams 58-2–58-4 have the same structure as the above-described carriage arm 56-1, spacer 57-1, and load beam 58-1, respectively.

Figure 8:
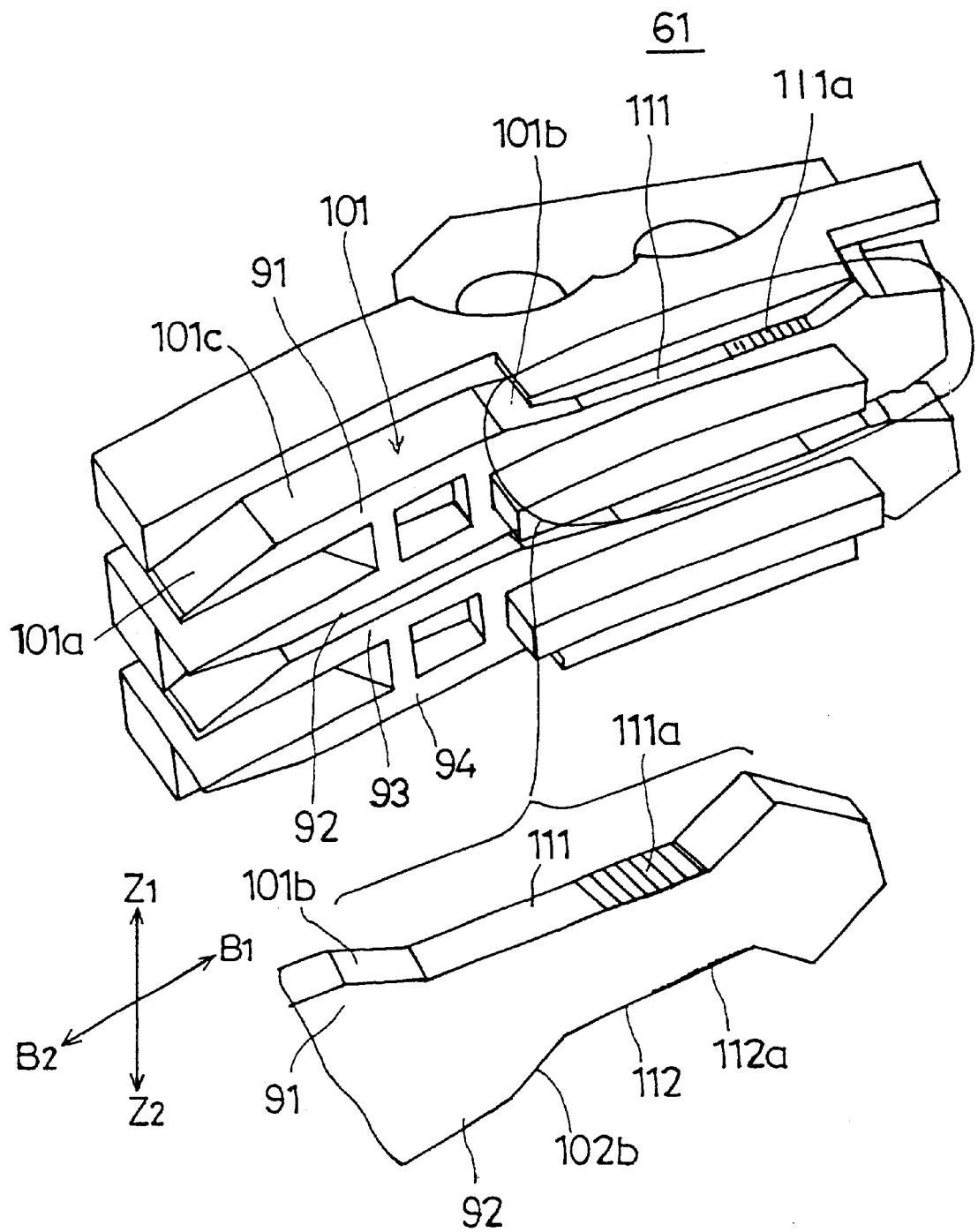
FIG. 8 is an enlarged perspective view of the ramp member shown in FIG. 3A.

FIG. 8 is an enlarged perspective view of the ramp member 61. The ramp member 61 is a molded component made of liquid crystal polymer. Referring again to FIG. 4, the ramp member 61 has a first ramp part 91 for the load bar 60-1, a second ramp part 92 for the load bar 60-2, a third ramp part 93 for the load bar 60-3 and a fourth ramp part 94 for the load bar 60-4. The ramp part 91 also has a guiding part 101 and a parking part 111.

The guiding part 101 has a trapezoidal shape and has a HD-side ramp surface 101a at a position closer to the hard disk 53-1, a parking part-side ramp surface 101b adjacent to the parking part 111 and an intermediate surface 101c between the HD-side and parking part-side ramp surfaces. All surfaces are made smooth for smooth movements of the finger part 60-1b of the load bar 60-1.

The parking part 111 is at a level equal to the level of the finger part 60-1b when the slider 59-1 is scanning the upper surface of the hard disk 53-1. With such a structure, when the unloading operation is completed, the load beam 58-1 is not warped and is in a natural state.

The parking part 111 is a horizontal surface and has a rugged part 111a. The rugged part 111a is provided for removing the powder on the finger part 60-1b of the load bar 60-1 while the finger part 60-1b moves along the parking part 111.

The remaining ramp parts 92, 93, 94 have a structure similar to the ramp part 91, and has guiding parts 102, 103, 104 and parking parts 112, 113, 114, respectively. The parking part-side ramp surface 101b of the guiding part 101 and the parking part-side ramp surfaces 102b, 103b, 104b of the guiding parts 102, 103, 104 are in turn relatively shifted towards the B1 direction along the B1–B2 direction. Referring to FIG. 4, a terminating end of the parking part-side ramp surface 101b and a starting end of the parking part-side ramp surface 102b are situated at the same position P1. A terminating end of the parking part-side ramp surface 102b and a starting end of the parking part-side ramp surface 103b are at the same position P2, and, a terminating end of the parking part-side ramp surface 103b and a starting end of the parking part-side ramp surface 104b are at the same position P3. Such mutually offset arrangement of the parking part-side ramp surfaces provides reduced load during the loading operation. The parking parts 112, 113 and 114 are horizontal surfaces and have rugged parts 112a, 113a, and 114a.

When a load command is supplied during the unloaded state shown in FIG. 3A, the actuator 62 is driven and the carriage arms 56-1 to 56-3 are pivoted in an anti-clockwise direction. The load bars 60-1 to 60-4 are moved over the guiding parts 101 to 104 along broken lines 121 to 124 shown in FIG. 4. The sliders 59-1 to 59-4 are loaded above the hard disks 53-1, 53-2 and are held against surfaces of the rotating hard disks 53-1, 53-2. Then, an information read/write operation is initiated.

When an unload command is supplied during the information reading/writing operation, the carriage arms 56-1 to 56-3 are pivoted in a clockwise direction. The load bars 60-1 to 60-4 are moved over the guiding parts 101 to 104 until they reach the parking parts 111 to 114. The hard disk device comes to an unloaded state as shown in FIG. 3B.

The characteristic features of the hard disk device 50 of the present invention will be described in detail.

1. Avoiding any head crash due to powder produced during unloading and loading operations When the hard disk device 50 is used over a considerably long period of time, and the loading and unloading operations are repeated for many times, the ramp parts 91 to 94 will be abrased and powder is produced. The powder may attach to the finger parts 60-1b to 60-4b. It is difficult to prevent such abrasion and to prevent the powder from being attached to the finger parts 60-1b, etc.

In the present embodiment, the parking parts 111 to 114 are provided with the rugged parts 111a to 114a. Therefore, when the unloading operation is implemented and the finger parts 60-1b to 60-4b reach the parking parts 111 to 114, and when the loading operation is started and the finger parts 60-1b to 60-4b are moving along the parking parts 111 to 114, the powder is rubbed by the rugged parts 111a to 114a and thus is removed from the finger parts 60-1b to 60-4b. In such a manner, the removal of the powder from the finger parts 60-1b to 60-4b is implemented at a position outside the outer periphery of the hard disks 53-1, 53-2. Therefore, the powder will fall off from the finger parts 60-1b to 60-4b at a position above the chassis base 51 and not on the hard disks 53-1 and 53-2.

Also, since the finger parts 60-1b to 60-4b are cleaned during each unloading operation, there will be substantially no powder on the finger parts 60-1b to 60-4b when the finger parts 60-1b to 60-4b are at positions opposing the hard disks 53-1, 53-2. Therefore, the powder will not fall onto the hard disks 53-1, 53-2 from the finger parts 60-1b to 60-4b.

Accordingly, a head crash due to the powder falling off from the finger parts 60-1b to 60-4b can be avoided in an effective manner.

Further, a program for slightly driving the actuator upon terminating the unloading operation is stored in the ROM 83 shown in FIG. 5. Upon terminating the unloading operation, the MPU 4 is operated by the program stored in the ROM 83 so as to slightly drive the actuator 62 via the servo controller 86 and the driver 88. The carriage arms 56-1 to 56-3 are slightly moved in the B1–B2 directions, and the finger parts 60-1b to 60-4b are slightly driven in a reciprocal manner in the B1–B2 directions within the range of the parking parts 111 to 114. During the operation, the powder is rubbed by the rugged parts 111a to 114a and thus is positively removed from the finger parts 60-1b to 60-4b. In such a manner, the finger parts 60-1b to 60-4b are cleaned well.

2. Reducing the load applied to the actuator 62 during the loading operation

As shown in FIG. 4, the parking part-side ramp surfaces 101b, 102b, 103b and 104b of the guiding parts 101, 102, 103, 104 are mutually offset towards the B1 direction in the B1–B2 direction. Therefore, when the actuator is driven and the carriage arms 56-1 to 56-3 are rotated in an anticlockwise direction: firstly, the finger part 60-4b ascends the parking part-side ramp surface 104b; then the finger part 60-3b ascends the parking part-side ramp surface 103b; then the finger part 60-2b ascends the parking part-side ramp surface 102b; and finally, the finger part 60-1b ascends the parking part-side ramp surface 101b. In this manner, the finger parts 60-1b to 60-4b ascend the parking part-side ramp surfaces 101b, 102b, 103b, 104b at relatively offset timings. Accordingly, the load applied to the actuator 62 will be temporally dispersed and the lead applied to the actuator 62.

This results in a reduction of a maximum driving current required for driving the actuator in the loading operation. With the hard disk device of the related art, the maximum driving current for the actuator during the loading operation is 15 mA. Whereas in the present embodiment, the maximum driving current for the actuator during the loading operation is only 3.7 mA which amounts to one quarter of that of the related art. As a result, the power consumption of the hard disk device 50 is reduced compared to the hard disk device of the related art.

It is to be noted that the unloading operation requires less load to be applied to the actuator 62 compared to the loading operation. Therefore, it is not problematic if the finger parts 60-1b to 60-4b ascend the ramp surfaces 101a to 104a at the same timing.

FIGS. 9 to 12 relate to variants of the mechanism for removing powder from the finger parts 60-1b to 60-4b.

Figure 9:
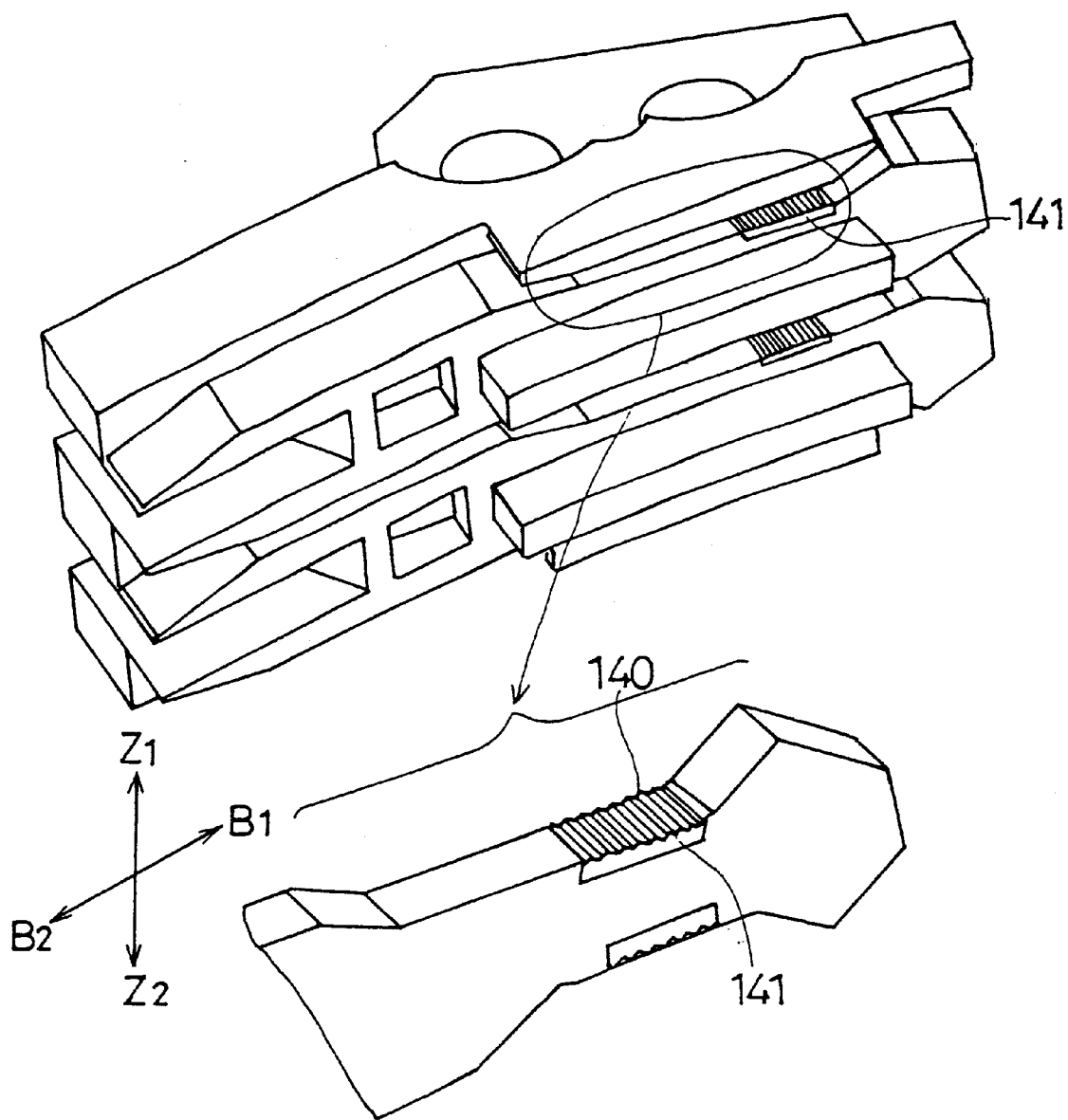
FIG. 9 is an enlarged perspective view of the ramp member of a first variant.

FIG. 9 is a diagram showing a first variant of the ramp member 61A. The parting part 111A is provided with a plate-like component 141 having a rugged part 140 formed by insertion. In other words, the component 141 is integrated with the ramp member 61A. The member 141 is made of a material that is harder than liquid crystal polymer.

The rugged part 140 has better abrasion resistance and thus the sharp edges of the rugged part 140 are maintained for a longer period of time. Therefore, the powder removing function of the rugged part 140 lasts longer than the embodiment described with reference to FIG. 8.

Figure 10:
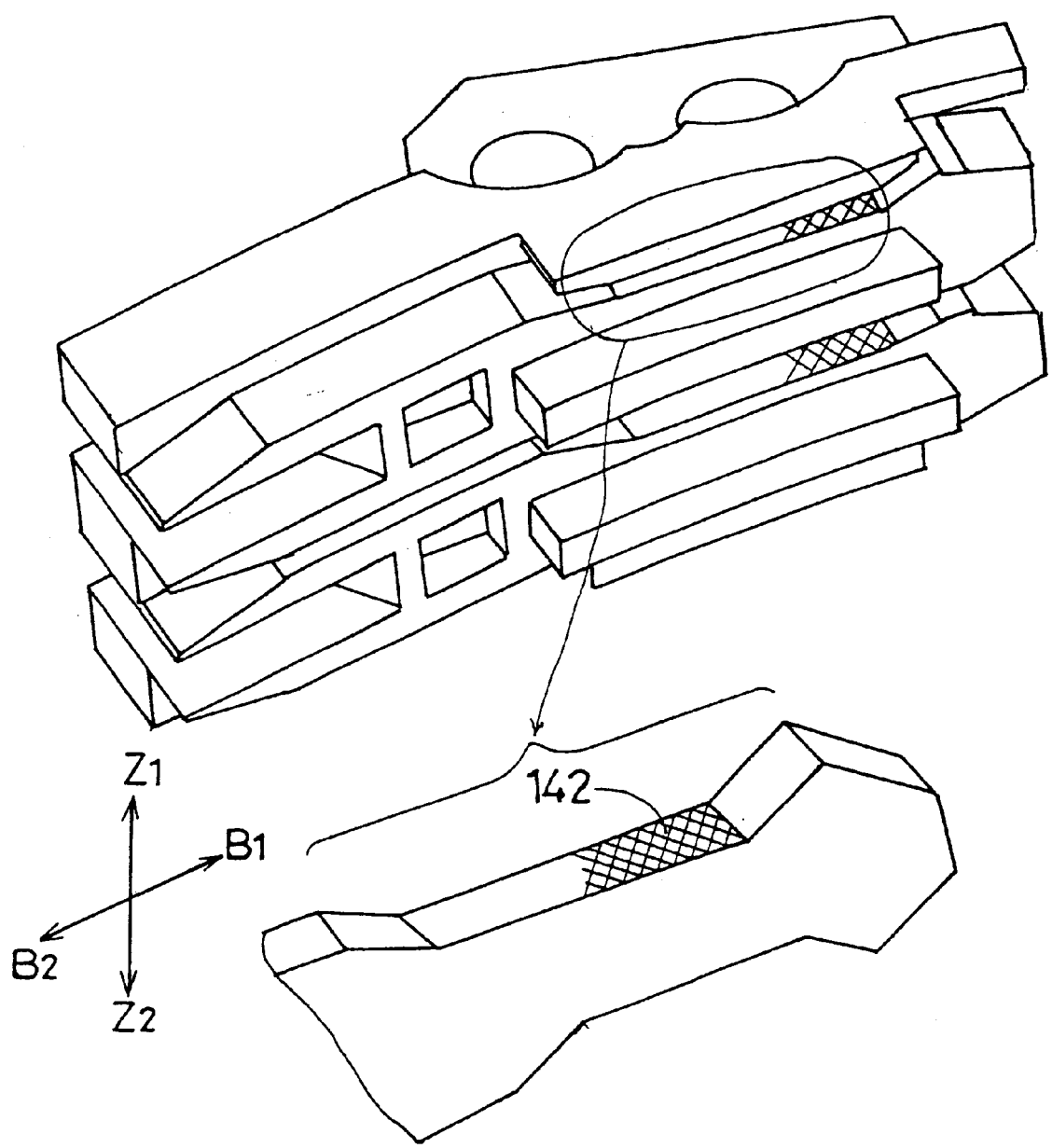
FIG. 10 is an enlarged perspective view of the ramp member of a second variant.

FIG. 10 is a diagram showing a second variant of the ramp member 61B. The parking part 111B is provided with a mesh-like rugged part 142. The mesh-like rugged part 142 may be a plate-like component having a mesh-like rugged part formed by insertion which is made of a material harder than liquid crystal polymer.

Figure 11:
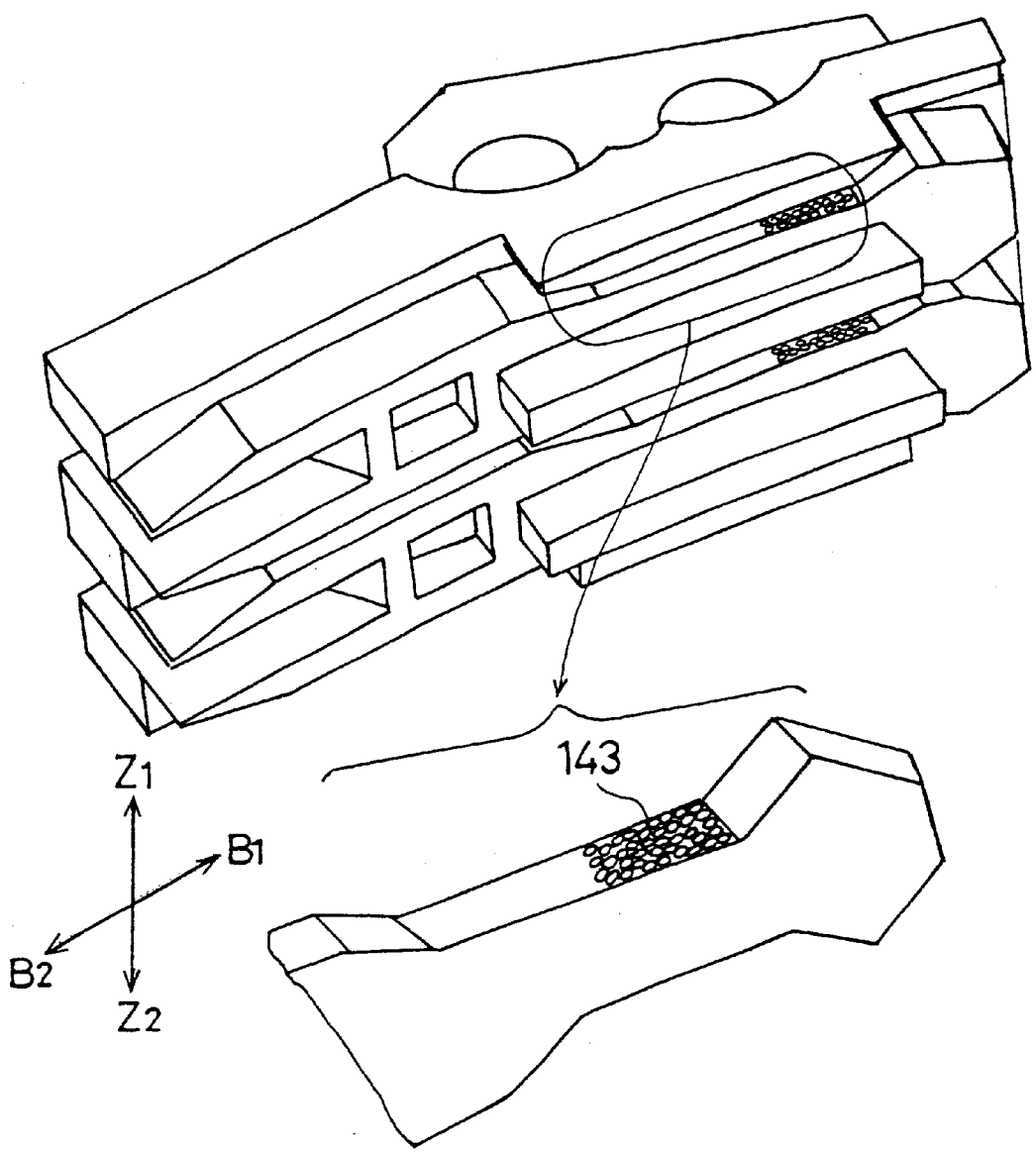
FIG. 11 is an enlarged perspective view of the ramp member of a third variant.

FIG. 11 is a diagram showing a third variant of the ramp member 61C. The parking part 111C is provided with a plurality of dimple parts 143. The rugged part may be a plate-like component having a plurality of dimple parts formed by insertion which is made of a material harder than liquid crystal polymer.

Figure 12:
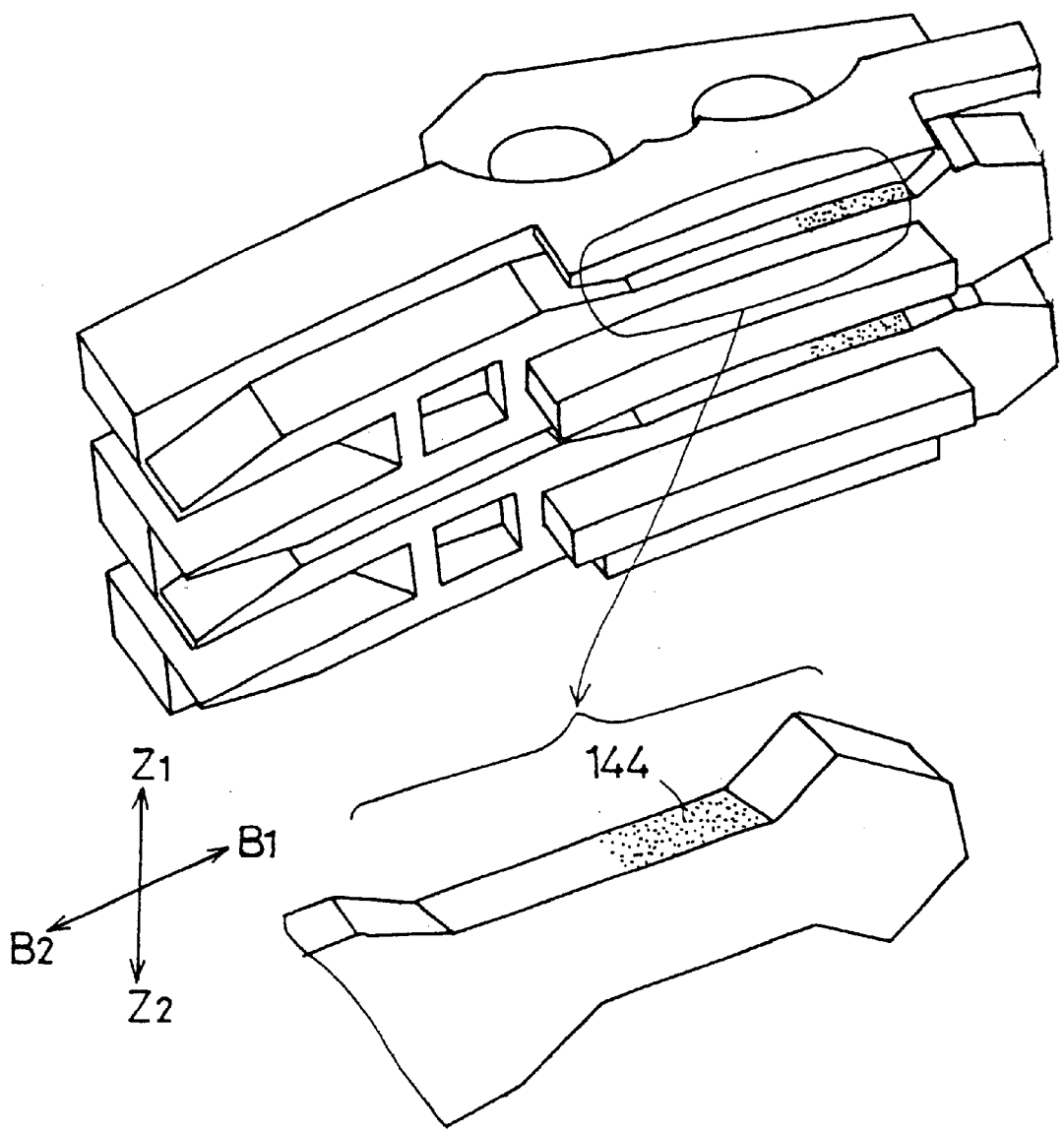
FIG. 12 is an enlarged perspective view of the ramp member of a fourth variant.

FIG. 12 is a diagram showing a fourth variant of the ramp member 61D. The parking part 111D is provided with a rough surface 143 with coarse texture.

Finally, a second embodiment of a mechanism for reducing the load applied to the actuator 62 during the loading operation will be described.

Figure 13:
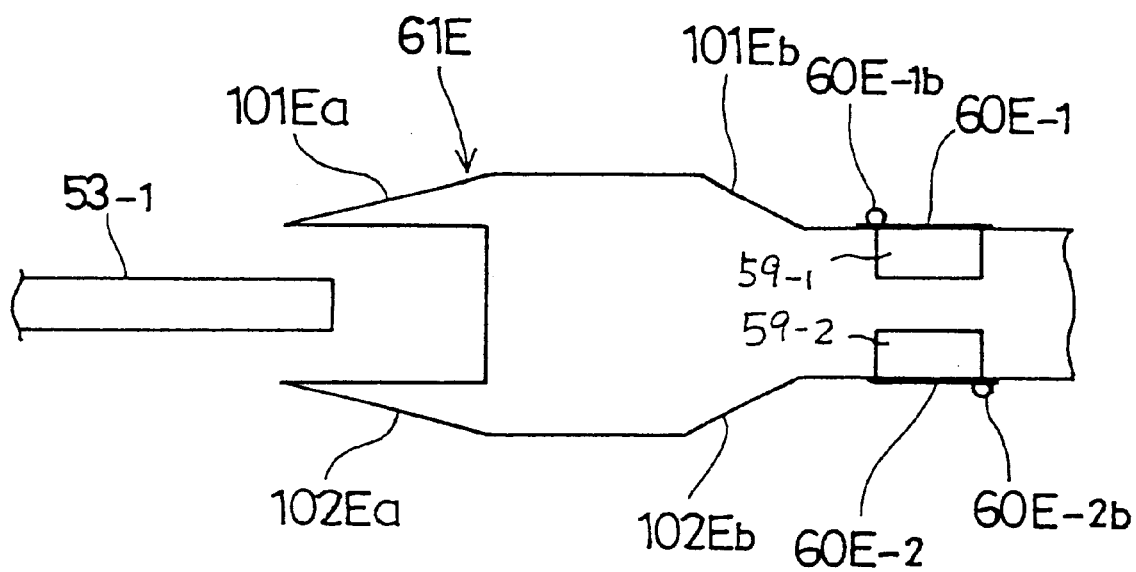
FIG. 13 is a schematic diagram showing a second embodiment of a mechanism for reducing the load applied to the actuator during a loading operation.

As shown in FIG. 13, the ramp member 61E is provided with parking part-side ramp surfaces 101Eb and 102Eb at the same position along the direction B1–B2. In this embodiment, the load bars 60E-1 and 60E-2 are configured such that the finger parts 60E-1b and 60E-2b are offset in the B1–B2 direction. Accordingly, during the loading operation, firstly, the finger 60E-1b ascends the parking part-side ramp surface 101Eb and then the finger part 60E-2b ascends the ramp surface 102Eb. Thus, the load applied to the actuator 62 is temporally dispersed.

With such a structure, during the unloading operation, the timings at which the fingers 60E-1b and 60E-2b ascend the HD-side ramp surfaces 101Ea and 102Ea are also offset. Therefore, the load applied to the actuator 62 is also temporally dispersed during the unloading operation.

Further, the present invention is not limited to these embodiments, and variations and modifications may be made without departing from the scope of the present invention.

The present application is based on Japanese priority application No. 2001-006661 filed on Jan. 15, 2001, the entire contents of which are hereby incorporated by reference.

What is claimed is:

1. A disk device comprising:

a chassis base;

at least one disk rotatably supported on said chassis base;

at least one carnage arm pivotable about an axis on one end and, at the other end, having a slider with a read/write head and a load bar extending from said slider;

a ramp member attached to said chassis base at a position outside said disk, said ramp member having a guiding part and a parking part; and an actuator for driving said carriage arm between a loaded position in which said slider is held above said disk and an unloaded position in which said load bar rests on said parking part of said ramp member, wherein said ramp member is provided with cleaning means for removing powder attached to said load bar as said load bar moves along the parking part, and wherein said cleaning means is provided as a plate-like component formed by insertion of a material harder than the material of the ramp member, said plate-like component being incorporated into said ramp member.

2. A disk device as claimed in claim 1, wherein said cleaning means is configured as a rugged part provided on the parking part.

3. A disk device as claimed in claim 1, wherein said ramp member is made of liquid crystal polymer.

4. A disk device as claimed in claim 1, wherein said cleaning means is configured as a rugged part having a plurality of recessed and raised parts arranged parallel to each other.

5. A disk device as claimed in claim 1, wherein said cleaning means is configured as a rugged part having a plurality of recessed and raised parts arranged in a mesh-like arrangement.

6. A disk device as claimed in claim 1, wherein said cleaning means is configured as a plurality of dimples.

7. A disk device as claimed in claim 1, wherein said cleaning means is configured as a rough surface with coarse texture.

8. A disk device as claimed in claim 1, further comprising means for slightly and reciprocally moving said load bar on said parking part.

9. A disk device comprising:

a chassis base;

at least one disk rotatably supported on said chassis base;

at least two carriage arms pivotable about an axis on one end and, at the other end, having a slider with a read/write head and a load bar extending from said slider;

a ramp member attached to said chassis base at a position outside said disk, said ramp member having a guiding part and a parking part;

an actuator for driving said carriage arms between a loaded position in which said slider is held above said disk and an unloaded position in which said load bar rests on said parking part of said ramp member, and timing offsetting means for offsetting the timing of said load bar of one of said carriage arms ascending said guiding part from the timing of said load bar of one of the other carriage arms ascending said guiding part when said carriage arms are driven to move from the unloaded position to the loaded position, wherein said guiding part comprises a disk-side ramp surface closer to the disk, a parking part-side ramp surface adjacent the parking part and an intermediate surface, and said timing offsetting means is configured such that parking part-side ramp surfaces are provided in a mutually offset manner in a direction of movement of the load bar when the said carriage arms are driven to move from the unloaded position to the loaded position.

10. A disk device as claimed in claim 9, wherein said timing offsetting means is configured such that load bars are provided at positions shifted towards the direction of movement of the load bar when the said carriage arms are driven to move from the unloaded position to the loaded position.

11. A disk device comprising:

a chassis base;

at least one disk rotatably supported on said chassis base;

at least two carriage arms pivotable about an axis on one end and, at the other end, having a slider with a read/write head and a load bar extending from said slider;

a ramp member attached to said chassis base at a position outside said disk, said ramp member having a guiding part and a parking part; and an actuator for driving said carriage arms between a loaded position in which said slider is held above said disk and an unloaded position in which said load bar rests on said parking part of said ramp member, wherein said ramp member is provided with cleaning means for removing powder attached to said load bar as said load bar moves along the parking part, and timing offsetting means is provided for offsetting the timing of said load bar of one of said carriage arms ascending said guiding part from the timing of said load bar of one of the other carriage arms ascending said guiding part when said carriage arms are driven to move from the unloaded position to the loaded position, wherein said guiding part comprises a disk-side ramp surface closer to the disk, a parking-part side ramp surface adjacent the parking part and an intermediate surface, and said timing offsetting means is configured such that said parking part-side ramp surfaces are provided in a mutually offset manner in a direction of movement of the load bar when the said carriage arms are driven to move from the unloaded position to the loaded position.

12. A disk device as claimed in claim 11, wherein said cleaning means is configured as a rugged part provided on the parking part.

* * * * *